June 18, 1935.  H. R. McDOUGAL  2,005,381
RECOVERY OF INGREDIENTS OF PLASTIC MATERIALS
Filed May 21, 1932
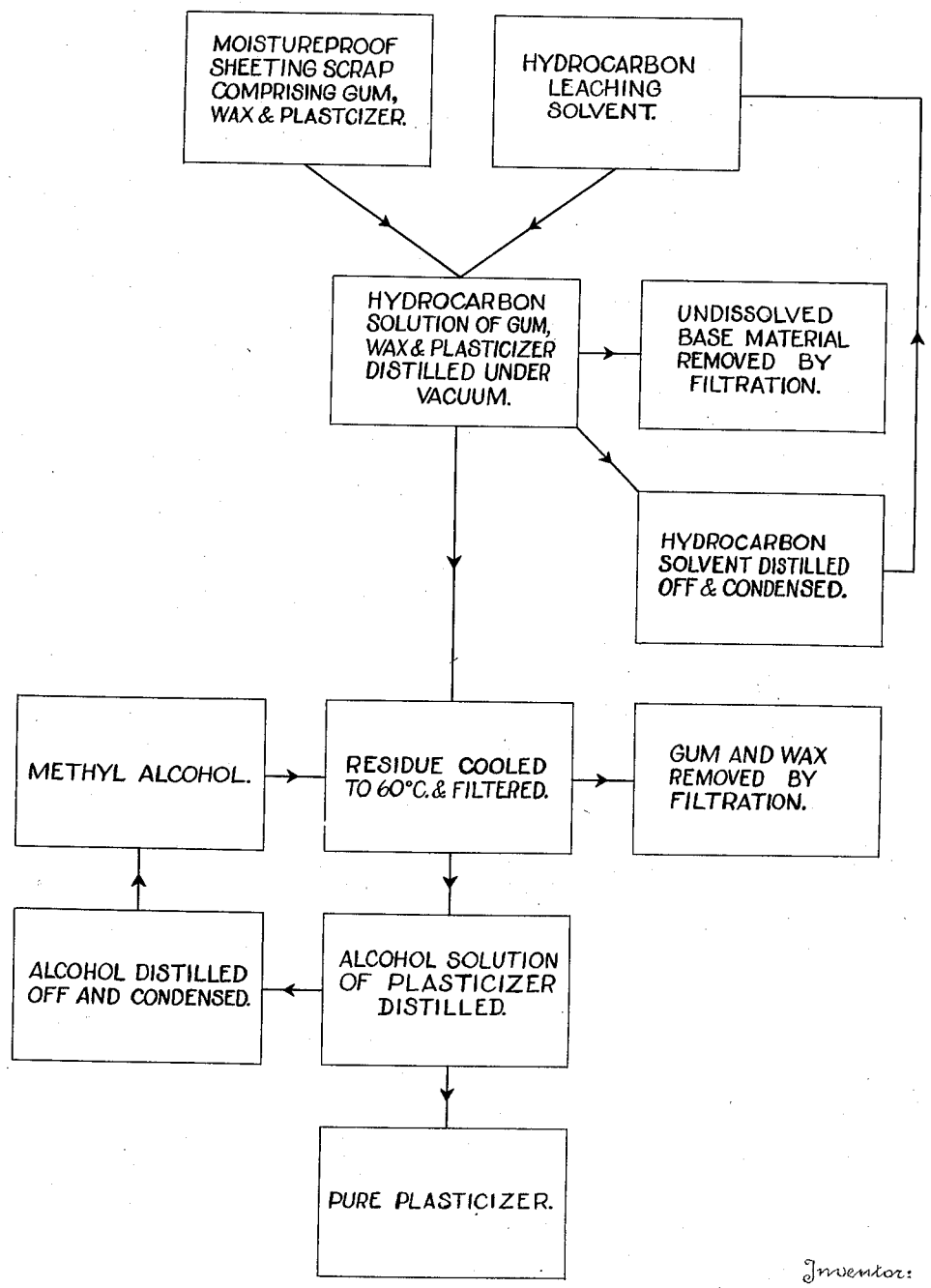

Patented June 18, 1935

2,005,381

UNITED STATES PATENT OFFICE 2,005,381

RECOVERY OF INGREDIENTS OF PLASTIC MATERIALS

Homer R. McDougal, Rochester, N. Y., assignor to Eastman Kodak Company, Rochester, N. Y., a corporation of New York Application May 21, 1932, Serial No. 612,852

7 Claims. (Cl. 260—103)

This invention relates to the recovery of the various ingredients entering into the composition of plastic products and more particularly to a process for the recovery of the materials used in the manufacture of thin, transparent, moistureproof cellulosic sheeting.

In the manufacture of so-called moistureproof sheeting, a composition containing various moisture-repelling constituents is applied to a thin transparent base sheet of viscose, cellulose acetate, cellulose ether or the like. There is a considerable amount of waste incident to the manufacture and use of such sheeting resulting from the spoiling of portions of the material in the processes to which it is subjected and from trimming or cutting in the manufacture of packages, cartons, wrapping materials and the like. It has become increasingly necessary to reduce the amount of such waste to a minimum in order to effect economies in manufacture and use.

In addition to the plasticizer, gums, waxes, and other ingredients entering into the formula of the moistureproofing composition, the base sheet itself, especially if produced from cellulose ester materials, such as cellulose acetate, contains a considerable percentage of valuable plasticizing materials. It has hitherto been impossible to treat this material in such a way that the plasticizer could be recovered in a pure form uncontaminated with other ingredients of the sheeting or its moistureproofing coating.

It is a principal object of the present invention to provide a process whereby this desirable result may be accomplished simply, effectively, and economically. A further object is to provide a method whereby plasticizers may be extracted from thin moistureproof sheeting of the type above indicated, uncontaminated by the presence of gums, waxes, or other contaminants. A still further object is to provide a process whereby the material of the base sheet of moistureproof sheeting may be recovered in such form that it may be re-used in film manufacture or analogous arts. A specific object is to provide a process for recovering a plasticizer such as diethyl phthalate from a thin, transparent, moistureproof cellulose acetate sheeting having a gum-wax overcoating thereon. Other objects will hereinafter appear.

These objects are accomplished by the following invention which in its simplest aspects comprises leaching the thin sheeting scrap with a solvent which dissolves off the moistureproof coating and, in addition, removes the plasticizer from the base sheet itself. The resulting solution is treated with an agent which precipitates the gum and wax components. These are separated by filtration and the plasticizer is obtained from the resulting liquid by fractional distillation or equivalent means.

In the following example I have set forth one of the preferred embodiments of my invention, but it is included merely for purposes of illustration and not in any sense as a limitation thereof. The accompanying drawing is a flow sheet of a typical recovery operation carried out in accordace with the procedure outlined below.

*Example I.*—A finely divided scrap material consisting of a thin, transparent, moistureproof cellulose ester sheeting containing diethyl phthalate and having a gum-wax overcoating comprising ester gum and paraffin is leached counter-currently with a solvent known as Stoddard solvent, which is a clear, waterwhite, petroleum distillate comprising a mixture of low boiling hydrocarbons having a boiling range of approximately 141–120° C. (100° F.), the full specifications of which are given in "Bureau of Standards Bulletin No. CS3–28, Stoddard Solvent", published by the Government Printing Office in 1929. The Stoddard solvent dissolves all of the ester gum and paraffin and extracts part or all of the diethyl phthalate. It is reused until the amounts of dissolved and extracted materials reach a predetermined limit which ordinarily should not exceed a concentration of 10% solids in the leaching solvent. This solution is then distilled under a vacuum of about 25 inches of mercury until a distillation temperature of about 160° C. is reached, or at atmospheric pressure to a temperature of 210° C. At this point the hydrocarbon solvent is completely removed and the residue in the stillpot contains substantially all of the plasticizer, ester gum, and paraffin. This residue is cooled to 60° C. or below, and methyl alcohol is added in an amount approximately equal in volume to the residue in the still, and the mixture stirred from 5 to 10 minutes, whereupon the gum and wax precipitate, forming a slurry. The precipitated paraffin and ester gum is filtered off and the filtrate is distilled under atmospheric pressure until a temperature of about 65° C. is reached. At this point the methyl alcohol is completely removed and the residue in the still pot consists of pure diethyl phthalate. The still pot residue may optionally be subjected to further distillation under vacuum to improve its appearance and properties. In some cases it may also be desirable to pass the filtrate obtained from the gum and wax slurry through bone char or similar material prior to the final distillation for the purpose of removing undesirable coloring matter which may be present.

In the recovery of solid plasticizers, such as orthobutyl para-toluene sulfonate, butyl sulfone, ethyl acetanilide, and the like, the same procedure is used, except that the plasticizer is separated from the final alcoholic solution by crystallization rather than distillation. Crystallization may be accomplished by simply evaporating off the solvent and cooling down until a saturated solution is produced from which pure crystals are readily obtained. Optionally the solid material may be separated from the alcoholic solution as disclosed in the copending application of M. Jerome Reid, Serial No. 612,850 filed May 21, 1932, by adding a plasticizer non-solvent such as water or other precipitant to the solution, thereby precipitating the plasticizer which may be easily separated by filtration or equivalent means.

Although I have found that the low-boiling hydrocarbon solvent as above defined known under the technical name of Stoddard solvent is especially effective for the leaching of thin sheeting scrap, I may use other hydrocarbons, such as gasoline, toluene, benzene, either alone or in mixtures made up in various proportions. I have also found a mixture of ethylene chloride and gasoline to be satisfactory. In some cases I may use a hydrocarbon solvent of lower boiling point than those just mentioned, such as the solvent known as Textile Spirits, a low boiling petroleum distillate comprising a mixture of low boiling hydrocarbons having a boiling range of approximately 70–105° C. The choice of the solvents or solvent mixture depends largely upon the solubility therein of the particular plasticizer dealt with as well as the solubility of the gum and wax constituents of the overcoating. The solvent should be a non-solvent for the material of the base sheet in order that the plasticizer and overcoating may be removed from the scrap but leave the cellulosic material substantially unaffected and in a sufficiently pure condition to be reused in the manufacture of thin sheeting and similar products.

A further point with respect to the solvent is that it should be capable of completely dissolving out the paraffin wax from the material, as it is well-known that the presence of even minute traces of paraffin which might find their way into a cellulose acetate dope prepared from re-claimed scrap make the coating and curing of a film support or other type of sheeting produced therefrom practically impossible. It is therefore necessary to completely eliminate the paraffin, not only from the scrap itself, but from the plasticizer which may be again introduced into such a dope. This desirable result is made possible by the practice of the invention herein described.

Although I have found methyl alcohol to be particularly effective in my process for the precipitation of the gum and wax from the plasticizer solvent, I may use other alcohols for this purpose, such as ethyl, butyl, and amyl alcohols or mixtures thereof. The principal requisite of such an agent is, of course, that it shall be a non-solvent with respect to the various gums and waxes and be capable of removal from the plasticizer solvent by distillation or equivalent means.

While I have described my invention with reference to diethyl phthalate, it is equally applicable to the treatment of scrap materials plasticized with other plasticizers, such as triphenyl phosphate, ortho-butylpara-toluene sulfonate, monochlornaphthalene, butyl sulfone, ethyl acetanilide, ethyl benzoate, tricresyl phosphate, and the like.

It is to be understood that the particular conditions of operation of my process as herein described are merely illustrative and may be changed in accordance with the particular type of scrap material dealt with, especially with reference to the components entering into the moistureproof overcoating and with reference to the particular plasticizer originally incorporated in the sheeting.

My invention is particularly applicable to the treatment of cellulose ester material, such as cellulose acetate, cellulose propionate, cellulose acetate-propionate, cellulose acetate butyrate, and, in fact, any sheet material produced from cellulose esters and containing a substantial amount of plasticizer. It may also be applied to the treatment of other types of thin sheeting, such as those having a base of regenerated cellulose, it being effective to remove the moistureproof coating and to recover the components generally present therein, such as plasticizers, gums, waxes, and the like.

It will be apparent that I have provided a simple, effective and economical means for the recovery of the various components entering into the manufacture of moistureproof, plastic products. Inasmuch as the plasticizer content of cellulose ester thin sheeting runs in some cases as high as 20–30% plasticizer, it is obvious that the process of the present invention makes possible the saving of a substantial amount of an expensive material in the manufacture of moistureproof products. Not only is the plasticizer content recovered, but the cellulose ester material is obtained in a pure form free from contamination with paraffin or other deleterious substances and in a condition in which it may be directly used in the manufacture of thin sheeting base material, film support, and similar products where absolute purity is important.

I make no claim herein to the broad process of recovering plasticizers by the use of a cellulose ester non-solvent followed by separation of the plasticizer from contaminants, as that process is the invention of M. Jerome Reid and is described in his copending application above referred to.

What I claim as my invention and desire to be secured by Letters Patent of the United States is:

1. The process of recovering the valuable components of moisture-resistant plastic materials containing in addition to a cellulosic base, a plasticizer selected from the group consisting of triphenyl phosphate, ortho-butyl para-toluene sulfonate, butyl sulfone, ethyl acetanilide, monochlornaphthalene, ethyl benzoate, tricresyl phosphate, and diethyl phthalate, ester gum, and paraffin wax, which comprises leaching out the plasticizer, gum and wax with a liquid which is a non-solvent for the base, but a common solvent for the plasticizer, gum and wax, distilling off the leaching solvent from the resulting solution, adding a gum-wax precipitant to the residue, removing the precipitated gum and wax and thereafter separating the plasticizer in pure form from the precipitant.

2. The process of recovering the valuable components of moisture-resistant plastic materials containing in addition to a cellulose ester base, a cellulose ester plasticizer selected from the group consisting of triphenyl phosphate, ortho-butyl para-toluene sulfonate, butyl sulfone, ethyl acetanilide, monochlornaphthalene, ethyl benzoate, tricresyl phosphate, and diethyl phthalate, ester gum, and paraffin wax, which comprises leaching out the plasticizer, gum and wax with a hydrocarbon liquid which is a cellulose ester non-solvent, but a common solvent for the plasticizer, gum and wax, distilling off the solvent from the resulting solution, adding a gum-wax precipitant to the residue, removing the precipitated gum and wax, and separating the plasticizer in pure form from the precipitant.

3. The process of recovering the valuable components of moisture-resistant plastic materials containing in addition to a cellulose ester base, a cellulose ester plasticizer selected from the group consisting of triphenyl phosphate, ortho-butyl para-toluene sulfonate, butyl sulfone, ethyl acetanilide, monochlornaphthalene, ethyl benzoate, tricresyl phosphate, and diethyl phthalate, ester gum and paraffin wax, which comprises leaching out the plasticizer, gum and wax with a hydrocarbon liquid which is a cellulose ester non-solvent, but a common solvent for the plasticizer, gum and wax, distilling off the leaching solvent from the resulting solution, adding alcohol to the residue, removing the precipitated gum and wax, and separating the plasticizer in pure form from its alcoholic solution.

4. The process of recovering the valuable components of moisture-resistant plastic materials containing in addition to a cellulose ester base, a cellulose ester plasticizer selected from the group consisting of triphenyl phosphate, ortho-butyl para-toluene sulfonate, butyl sulfone, ethyl, acetanilide, monochlornaphthalene, ethyl benzoate, tricresyl phosphate, and diethyl phthalate, ester gum and paraffin wax, which comprises leaching out the plasticizer, gum and wax with a hydrocarbon liquid which is a cellulose ester non-solvent but a common solvent for the plasticizer, gum and wax, distilling off the solvent from the resulting solution, adding alcohol to the residue, removing the precipitated gum and wax from the mixture, and distilling off the alcoholic solvent from the plasticizer.

5. The process of recovering the valuable components of moisture-resistant plastic materials containing in addition to a cellulose ester base, a cellulose ester plasticizer selected from the group consisting of triphenyl phosphate, ortho-butyl para-toluene sulfonate, butyl sulfone, ethyl acetanilide, monochlornaphthalene, ethyl benzoate, tricresyl phosphate, and diethyl phthalate, ester gum and paraffin wax, which comprises leaching out the plasticizer, gum and wax with a hydrocarbon liquid which is a cellulose ester non-solvent but a common solvent for the plasticizer, gum and wax, distilling off the solvent from the resulting solution, adding a gum-wax precipitant to the residue, removing the precipitated gum and wax from the mixture and crystallizing out the plasticizer from the resulting solution in pure form.

6. The process of recovering the valuable components of moisture-resistant thin sheeting containing in addition to a cellulose ester base, a cellulose ester plasticizer selected from the group consisting of triphenyl phosphate, ortho-butyl para-toluene sulfonate, butyl sulfone, ethyl acetanilide, monochlornaphthalene, ethyl benzoate, tricresyl phosphate, and diethyl phthalate, ester gum and paraffin wax, which comprises leaching out the plasticizer, gum and wax with a hydrocarbon liquid which is a cellulose ester non-solvent but a common solvent for the plasticizer, gum and wax, and has a boiling range of from about 70–210° C., distilling off the solvent from the resulting solution adding an aliphatic alcohol to the residue, removing the precipitated gum and wax and distilling off the alcohol from the plasticizer.

7. The process of recovering di-ethyl phthalate from scrap material comprising thin transparent cellulose acetate sheeting having an overcoating of ester gum, paraffin and di-ethyl phthalate which comprises leaching out the di-ethyl phthalate, gum and paraffin from the material with Stoddard solvent, distilling off the solvent from the resulting solution of gum and wax and di-ethyl phthalate, adding methyl alcohol to the residue in sufficient amount to precipitate all of the gum and paraffin, removing the precipitated gum and paraffin, and thereafter distilling off the methyl alcohol from the remaining alcoholic solution of di-ethyl phthalate.

HOMER R. McDOUGAL.